United States Patent
Meier

(10) Patent No.: US 6,215,068 B1
(45) Date of Patent: Apr. 10, 2001

(54) LINE GUIDING ASSEMBLY

(75) Inventor: Karl Meier, Heideck (DE)

(73) Assignee: Kabelschlepp GmbH, Siegen (DE)

( * ) Notice: Subject to any disclaimer, the term of this patent is extended or adjusted under 35 U.S.C. 154(b) by 0 days.

(21) Appl. No.: 08/910,382

(22) Filed: Aug. 13, 1997

Related U.S. Application Data

(63) Continuation of application No. 08/485,931, filed on Jun. 8, 1995, now abandoned, which is a continuation of application No. 07/807,018, filed on Dec. 10, 1991, now abandoned.

(30) Foreign Application Priority Data

Dec. 13, 1990 (DE) ............................................. 90 16 870 U
Apr. 5, 1991 (DE) ................................................. 91 15 430

(51) Int. Cl.[7] .................................................... H02G 11/00
(52) U.S. Cl. ........................... 174/68.1; 59/78; 191/12 R; 191/12 C
(58) Field of Search ..................................... 174/69, 99 E, 174/136, 117 F, 117 FF, DIG. 9; 59/78, 78.1; 191/12 C, 12 R; 248/51, 59

(56) References Cited

U.S. PATENT DOCUMENTS

| 3,332,434 | 7/1967 | Stahmer . |
| 3,630,325 | 12/1971 | Corl et al. . |
| 3,779,003 | 12/1973 | Boissevain et al. . |
| 4,545,621 | 10/1985 | Sharp . |
| 4,861,135 | 8/1989 | Rohner et al. . |
| 5,230,420 | 7/1993 | Meier et al. . |
| 5,322,480 | 6/1994 | Meier et al. . |
| 5,343,989 | 9/1994 | Hu et al. . |

FOREIGN PATENT DOCUMENTS

| 265449 | 10/1987 | (DD) . |
| 963077 | 10/1953 | (DE) . |
| 970361 | 1/1954 | (DE) . |
| 1154692 | 2/1962 | (DE) . |
| 1128900 | 5/1962 | (DE) . |
| 1675330 | 2/1968 | (DE) . |
| 2314313 | 3/1973 | (DE) . |
| 2427150 | 6/1974 | (DE) . |
| 7908344 | 3/1979 | (DE) . |
| 2814232 | 2/1982 | (DE) . |
| 3300495 | 1/1983 | (DE) . |
| 3608309 | 3/1986 | (DE) . |
| 3742448 | 12/1987 | (DE) . |
| 3829428 | 8/1988 | (DE) . |
| 8706822 | 9/1988 | (DE) . |
| 0194891 | 3/1986 | (EP) . |
| 0293886 | 6/1988 | (EP) . |
| 0289703 | 11/1988 | (EP) . |
| 0490022 | 4/1991 | (EP) . |
| 1460204 | 12/1965 | (FR) . |
| 937820 | 9/1963 | (GB) . |
| 2187865 | 9/1987 | (GB) . |
| 1534596 | * 1/1990 | (SU) ................................. 191/12 R |

OTHER PUBLICATIONS

"Plastic Support Chain" Murrplastik, Jun. 1987, E5201/86, West Germany.

Kabelschlepp GmbH Catalogue.

* cited by examiner

Primary Examiner—Hyung-Sub Sough
(74) Attorney, Agent, or Firm—Foley & Lardner

(57) ABSTRACT

A line guiding assembly is provided having lines that are held together by a common line bundling apparatus. The line bundling apparatus has disposed on its outside a sliding apparatus which acts in the longitudinal direction of the lines. The sliding apparatus prevents friction between an upper length portion and a lower length portion of a line assembly.

6 Claims, 16 Drawing Sheets

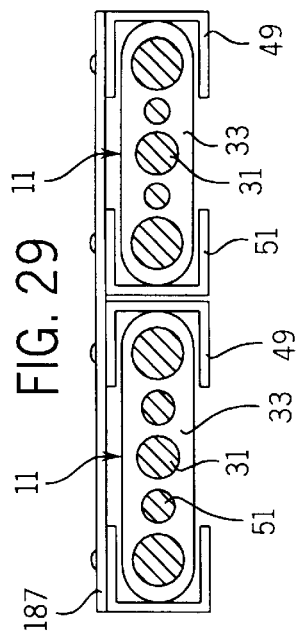
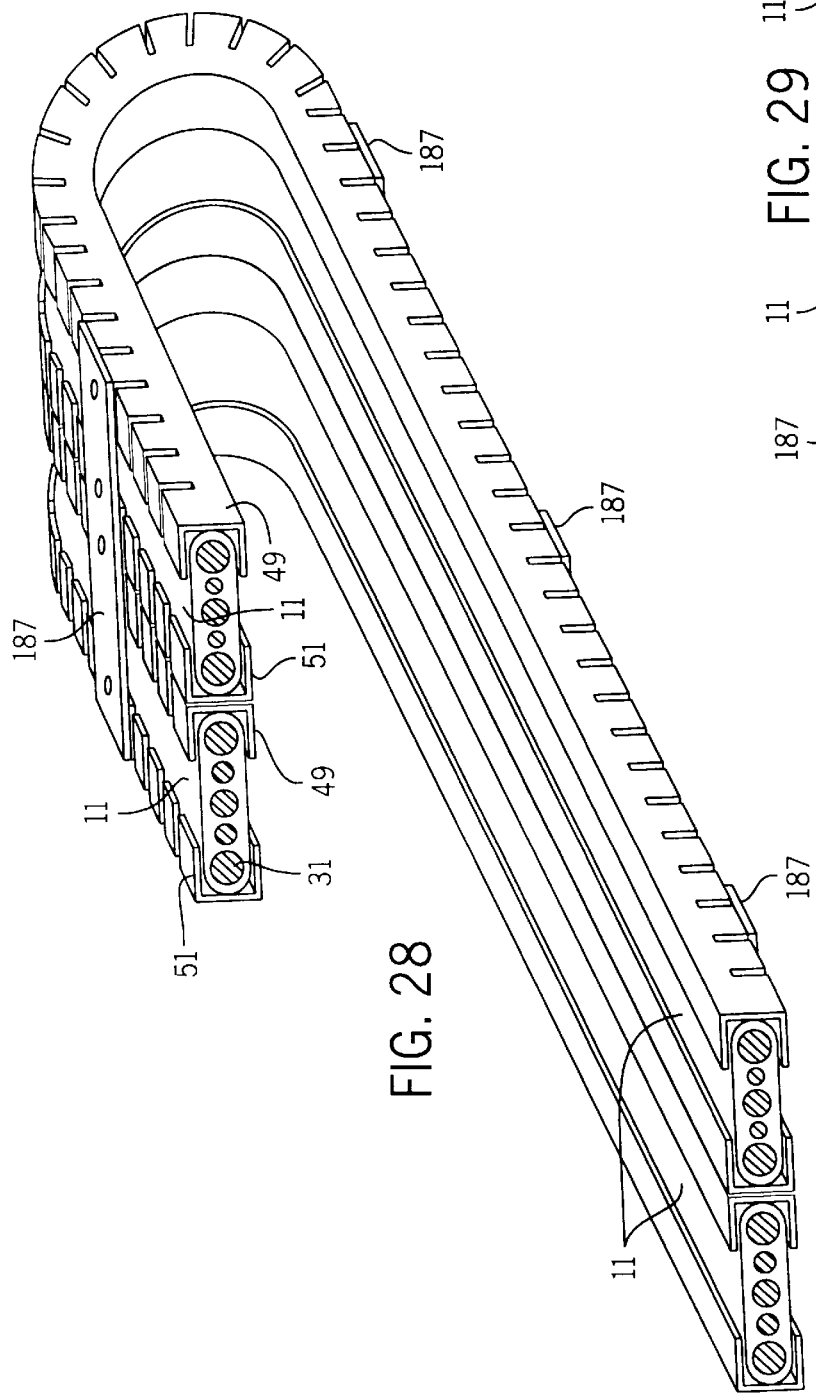
FIG. 28
FIG. 29

LINE GUIDING ASSEMBLY

This application is a continuation of application Ser. No. 08/485,931, filed Jun. 8, 1995, now abandoned; which is a continuation of application Ser. No. 07/807,018, which was filed Dec. 10, 1991, which is now abandoned.

FIELD OF THE INVENTION

The present invention relates to a flexible cable carrier. More particularly, the invention relates to a line guiding assembly comprising a line guiding channel and a line assembly guided therein.

BACKGROUND OF THE INVENTION

At times, it is necessary to provide an assembly for a transfer between a stationary means and a reciprocating means. The transfer may comprise electrical energy transfer, optical energy transfer, or a transfer of gaseous, and/or transfer of liquid substances. In general, to accomplish such a transfer, the stationary means and the movable means must be connected to each other by way of a plurality of lines, which must be routed such that they mate and participate in the relative movement between the stationary means and the movable means. Typically, such routing has been accomplished by employing a "dragchain assembly".

A dragchain assembly, comprises two or more chain bands of metal or plastic material which are interconnected by webs at longitudinally spaced locations. These webs hold the two or more chain bands in a defined distance, and hold the individual lines in a position corresponding to the particular shape of the dragchain. The dragchain may also consist of elements which are joined in the manner of chain links within which the lines are inserted.

Upon moving the reciprocating means, the end of the dragchain attached to the movable means is moved in the longitudinal direction of the dragchain relative to the dragchain end attached to the stationary means. As a consequence thereof, the position of the dragchain loop changes in the longitudinal direction of the dragchain. There is also a change concerning the individual chain links participating in the loop formation. When a specific dragchain length is exceeded, the upper chain length sags to such an extent that the upper chain length possibly is deposited on the lower chain length.

Dragchains are a complex and correspondingly expensive solution. The lines guided by them are subject to considerable mechanical loads. Due to the movement of the dragchain, and in particular, the migration of the location of the dragchain loop, friction is caused between the lines and the individual dragchain elements. In particular, friction is caused between the webs interconnecting the chain bands. Accordingly, provisions must be made so that the individual lines guided by the dragchain are all of equal length, otherwise, individual lines of the dragchain are subject to excessive tensile loads. Also, at both ends of the dragchain, the individual lines usually are connected to electrical connectors, accordingly, provisions must be made for a specific strain relief of the individual lines.

Due to the unsupported length of the dragchain, the upper chain length often drops onto the lower chain length, causing wear to the dragchain. When this is to be avoided, an intermediate ceiling in the form of a slide plate must be inserted in the guiding channel. This slide plate must be sufficiently strong to carry the upper chain length. However, the slide plate cannot extend across the entire moving distance of the movable means, otherwise, the dragchain loop would be hindered by the slide plate after only a short moving distance of the movable means. When a dragchain assembly is used having two dragchains moving in opposite directions, such a slide plate cannot be employed, except for the short distance between the stationary ends of the two dragchains moving in opposite directions.

In addition to the foregoing structural shortcomings of conventional dragchains, dragchain assemblies are very expensive.

Individual cabling, having no dragchain or other suitable supporting slide assembly, sustains very high friction and abrasion between overlapping cable portions. This friction prevents the overlapping portions of the cable to freely slide against each other, which may eventually cause a fracture of the cable and rapid wear of the cable jacket. Furthermore, high tensile and thrusting forces are necessary to be exerted on the cable in order to overcome the friction.

The foregoing illustrates limitations known to exist in present flexible cable carriers. Thus, it is apparent that it would be advantageous to provide an improved cable carrier directed to overcoming one or more of the limitations set forth above. Accordingly, a suitable alternative is provided including features more fully disclosed hereinafter.

SUMMARY OF THE INVENTION

A line guiding assembly is provided comprising lines that are held together by a common line bundling means. The line bundling means has disposed on its outside a sliding means with good slidability which acts in the longitudinal direction of the lines. The sliding means prevents friction between an upper length portion and a lower length portion of a line assembly.

Alternatively, the stationary means and the movable means may also be connected to only one single line. In this case, it is sufficient to design the line bundling means for receipt of only one line.

The line bundling means may comprise line clamps spaced apart in the longitudinal direction of the line assembly which hold the lines in an enclosed manner, with the sliding means being disposed on the outside of said line clamps. The line bundling means may comprise a cable jacket which encloses the lines.

The sliding means may have many different configurations. For instance, it may be a flexurally resilient sliding hose, having good sliding properties, which completely encloses or replaces the cable jacket. For example, the sliding hose may comprise a plastic material with good slidability that is extruded onto the cable jacket. The sliding means may also comprise sliding bands located on a surface of the cable jacket where the upper length portion and the lower length portion thereof are in confronting relation. Moreover, the sliding means may comprise sliding ledges disposed on both sides of the line clamps or cable jacket, respectively, with the height of the ledges designed so that it exceeds, on both sides thereof, the thickness of the line assembly surrounded by the line clamps or the cable jacket, respectively. The sliding means may also comprise sliding channels attached to both longitudinal sides of the line clamps or cable jacket, respectively, and which cover them with material having good sliding capability, not only laterally, but also in the side portion, at the bottom, and at the top.

These sliding means can be attached to the line clamps or the cable jacket in various ways. These include, but are not limited to gluing, welding, (e.g. ultrasonic welding), extrusion of anchoring means disposed on the sliding means into the cable jacket, riveting, nailing, and positively interengaging connecting elements on the cable jacket and sliding means.

The sliding means consist of a flexurally elastic material, such as steel, or a slidable plastic material, such as polyurethane, polyamide, and polytetrafluoroethylene. The material of the sliding means is preferably stiffer than the material of the cable jacket. The sliding means then does not only form a mechanical sliding protection for the cable jacket, but is adapted to keep the tensile and thrust forces, exerted during reciprocation of the movable means, away from the line assembly. When the longitudinal ends of the sliding means are attached in such a manner to the stationary and the movable means, respectively, a strain relief for the line assembly is also established.

Where the sliding means is made of a material of greater stiffness than the cable jacket material and defined by vertically extending portions, a mating vertically extending groove formed in the longitudinal direction of the sliding means is also required. This groove may include gaps, such as wedge-shaped gaps, that open towards the top side of the lower cable length and the bottom side of the upper cable length, so as to render flexure in the region of the loop between lower length and upper length. When the sliding means, in addition to the vertical portion, has a horizontal portion on the top side of the lower length and on the bottom side of the upper length, respectively, the gaps are provided in continued form in this horizontal portion as well.

The sliding means may also comprise a multiplicity of sliding members distributed across the length of the line assembly and projecting from both sides of the line assembly which are guided in guiding channels on both sides of the assembly. For this purpose, there is provided on each side a pair of parallel superimposed guiding channels in which the sliding elements are located. The two guiding members of each guiding channel pair are connected to each other by a curved channel piece guiding those sliding members that are located in the region of the assembly forming the loop. Due to the fact that the location of the loop of the assembly changes with the movement of the movable means, the location of the curved channel pieces must be displaceable in a corresponding manner. When the curved channel piece is fixedly connected to the associated guiding channel pair, this displaceability is achieved by a common movability of the guiding channel pair and the associated curved channel piece in the direction of movement of the movable means. When the guiding channels are to be kept stationary, movement of the curved channel pieces concomitantly with the migration of the line assembly loop along the traversing path or path of movement can be achieved by mounting the curved channel pieces on sliding blocks slidably supported in the guiding channels. The curved channel pieces are then located outside of the guiding channels so that they are displaceable relatively to the latter. For this purpose the sliding blocks are provided with a ramp via which the sliding members disposed on the line clamps or the cable jacket, respectively, can be passed from the guiding channels into the curved channel pieces or vice versa. For rendering possible such passage, this embodiment of the invention provides that the sliding members disposed on the line clamps or the cable jacket, respectively, are each adapted to be pushed in against the force of a compression spring, in a transverse direction to the direction of movement of the movable means to such an extent that the ramp heights of the sliding blocks are balanced.

The lines are preferably part of a ribbon cable. However, they may also be round cables or individual conductors.

A line assembly provided with the sliding means acts in the manner of a self-supporting, self-dragging line assembly. There is no need for further dragchains or drag hoses. When sliding bands, sliding rails, sliding ledges, sliding channels and the like are employed, the upper cable length can be deposited on the lower cable length without any problem since the line assembly part of the upper length does not contact the line assembly part of the lower length, but rather only the portions of the sliding means belonging to the upper length and to the lower length perform a sliding motion on each other.

It is also possible to combine several line assemblies, each provided with a sliding means, so as to form a common group unit, by connecting the sliding means of the individual line assemblies to each other. This applies to situations where ribbon cables are provided only with a sliding means partly covering them, such as lateral sliding channels, as well as for line assemblies which are each accommodated in a sliding hose.

In a particularly preferred embodiment, where the movable means is a reciprocating robot, the movable means is provided with a spacer holding the end of the line assembly to be moved together with the movable means at a low height so that the upper length in this portion is guided so as to be in contact with or only closely above the lower length, thereby eliminating the S-shape creation in the line assembly. This also results in the elimination of high stress loads.

In the region of the stationary end, the line assembly is preferably held in a compensation loop projecting from the sliding means and having both ends clamped in place by means of one line clamp each. The line clamp mounted at the end of the compensation loop located on the side of the sliding means is movable, preferably in resilient manner, relative to the sliding means in the longitudinal direction of the cable.

BRIEF DESCRIPTION OF THE DRAWINGS

FIG. 28 shows a perspective view of a group unit comprising two combined line assemblies.

FIG. 29 shows a plan view of a longitudinal end of the group unit depicted in FIG. 28.

DETAILED DESCRIPTION OF THE INVENTION

In contrast to systems where cable jackets are in contact causing abrasion, an assembly is provided wherein the friction is shifted solely in a sliding means. The sliding means is comprised of a material which is chosen independently of the aspects concerning cables, and solely according to aspects of low friction. High pressure and tensile forces acting on the cable are thereby avoided. These pressure and tensile forces are taken up by the sliding means. Therefore, line assembly need not be designed for high mechanical loads, which translates into a more economically designed assembly. As should be understood, movement of the line assembly occurs without any special consideration for the length thereof, for the possible relative positions between a stationary means and a movable means, and regardless of whether the line assemblies are moving in opposite directions.

In the embodiments of the present invention described herein, the line assembly is completely relieved from any frictional forces between the upper and lower length portions thereof. The sliding means of the present invention can be attached directly to a cable or a line. However, it is also possible to use a channel-shaped sliding means in which one or more cables or individual conductors are loosely inserted. Such line channels may be advantageously provided with flexure notches or flexure gaps so as to enable loop flexure of the conductors or cables which have been inserted therein.

The invention is best understood by reference to the accompanying drawings.

Figure 1:
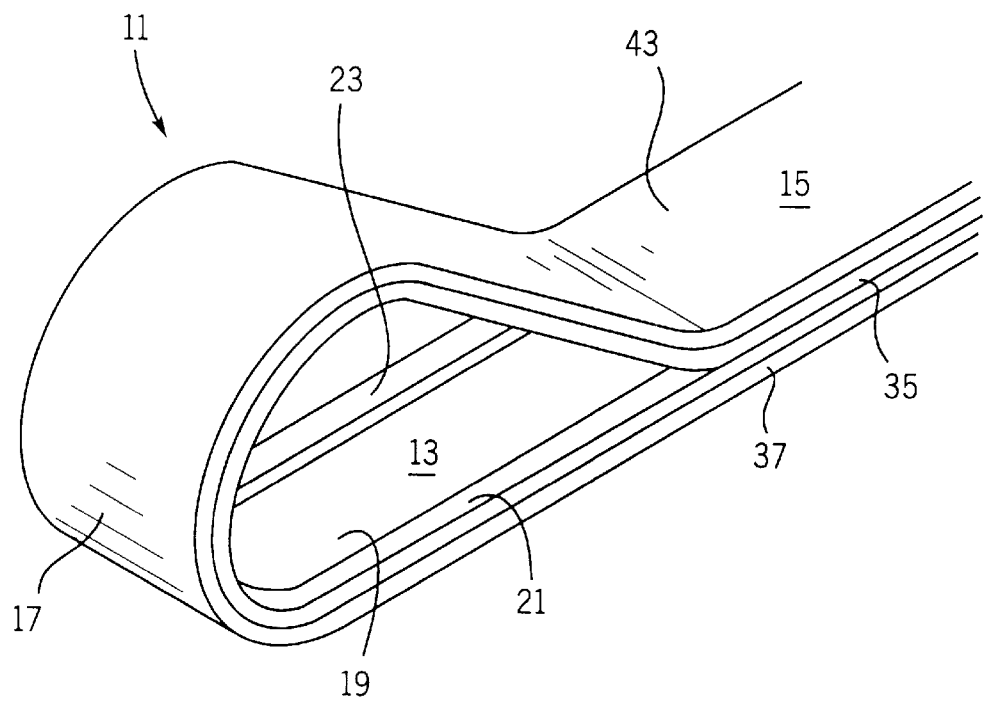
FIG. 1 shows a first embodiment of a ribbon cable having a sliding means in the form of sliding bands on the surface of the ribbon cable located between upper length and lower length thereof.

FIG. 1 shows in a schematic partial view of a ribbon cable having a lower length 13 and an upper length 15 deposited thereon. The two lengths are connected to each other via a loop 17. Sliding bands 21 and 23, respectively, are disposed on each of two longitudinal edges of the ribbon cable 11. Lower length 13 and upper length 15 are arranged in a mutually confronting relation defining an "inside surface" 19. The sliding bands may comprise a steel strip or a plastic material having good sliding capacity. Suitable plastic materials include polyurethane, polyamide (Nylon), and polytetrafluoroethylene.

Figure 2:
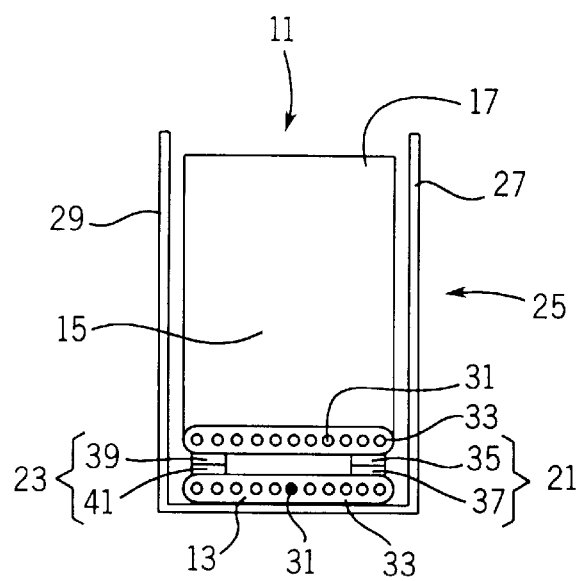
FIG. 2 shows a partial sectional view of the embodiment of FIG. 1 in cooperation with a line guiding channel.

FIG. 2 illustrates the ribbon cable 11 shown in FIG. 1 in a line guiding channel 25 in the form of an upwardly open trough consisting of aluminum, or any other suitable sheet metal. The line guiding channel 25 is of somewhat greater width than the ribbon cable 11. In this embodiment, the height of the line guiding channel 25 is chosen such that side walls 27 and 29 of the line guiding channel 25 project somewhat beyond the highest point of the loop 17. The side walls 27 and 29 have the purpose of laterally guiding the ribbon cable 11 and the loop 17. Thus, a lower side wall height than that shown in FIG. 2 is possible as well.

The ribbon cable 11 contains a series of juxtaposed electrical lines 31 surrounded by an extruded cable jacket 33 of plastic material. Outside of the region of the loop 17, an upper length portion 35, of the sliding band 21, lies on a lower length portion 37 of this sliding band. An upper length portion 39, of the sliding band 23, lies on a lower length portion 41 of this sliding band.

When a movable means, (not shown in the drawings) such as a robot for example, to which a free end of the upper length 15 is connected, is moved in the longitudinal direction of ribbon cable 11, the upper length portions 35 and 39, of the two sliding bands 21 and 23, slide on the associated lower length portions 37 and 41, respectively. The location where loop 17 is formed is shifted in accordance with the traversing motion of the movable means.

During this traversing motion, there is no sliding motion of a surface portion of the ribbon cable 11 on another surface portion of this ribbon cable or on any other surface. The inside surface 19 is held in a spaced manner by means of the sliding bands 21 and 23. The other surface of the ribbon cable, which is referred to as an "outside surface", merely carries out a rolling motion on the floor of the line guiding channel, in the region of the loop 17 without any sliding. All sliding motions are performed by the two sliding bands 21 and 23.

Embodiments of ribbon cables 11 with various sliding means are shown in FIGS. 3–10.

Figure 3:
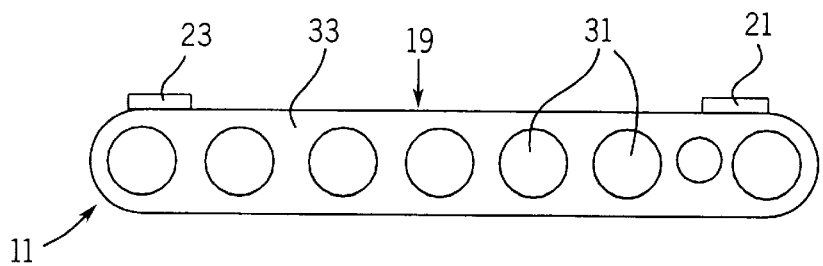
FIG. 3 shows an embodiment having sliding bands disposed at the edges.

FIG. 3 shows an enlarged cross-sectional view of the embodiment depicted in FIGS. 1 and 2, comprising two sliding bands 21 and 23 each disposed at an edge of ribbon cable 11 on the inside surface 19. The two sliding bands 21 and 23 may be steel spring bands or flexurally elastic plastic bands. They may be attached to the cable jacket by any suitable method, such as by gluing or ultrasonic welding for example.

Figure 4:
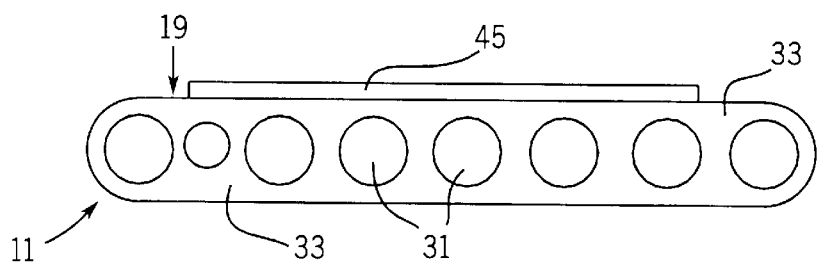
FIG. 4 shows an embodiment having a centrally disposed sliding band.

FIG. 4 depicts an embodiment in which one single, centrally disposed sliding band 45 is provided instead of the two laterally disposed sliding bands 21 and 23, as shown in FIG. 3.

Figure 5:
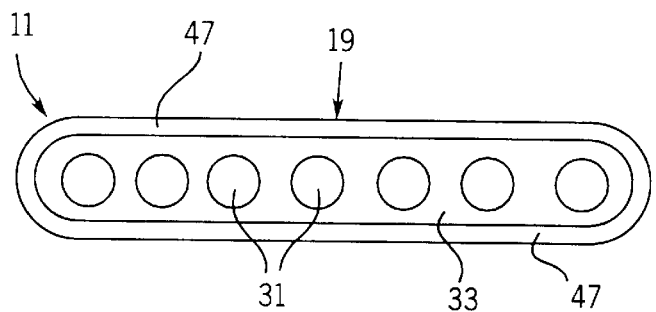
FIG. 5 shows an embodiment having a hose-like sliding means.

FIG. 5 shows an embodiment in-which cable jacket 33 of ribbon cable 11 is completely enclosed by a flexible sliding tube or hose 47. The sliding tube 47 may consist of a material having sufficient flexural elasticity for being able to match the flexure of the ribbon cable 11 in the region of the loop 17. Alternatively, the sliding hose 47 may be provided, with a multiplicity of transverse notches or gaps which are spaced apart in the longitudinal direction of the cable on its outside surface located at the bottom in FIG. 5. These notches or gaps also extend around the two round longitudinal side edges of the flat cable 11 and continue up to the transition of the longitudinal sides into the upper inside surface of the sliding hose 47. These gaps are of a wedge-shaped configuration in the region of the longitudinal side edges. The sliding hose 47 may also be used instead of the cable jacket 33. It may be extruded together with the cable jacket 33, or in place of the same.

Figure 6:
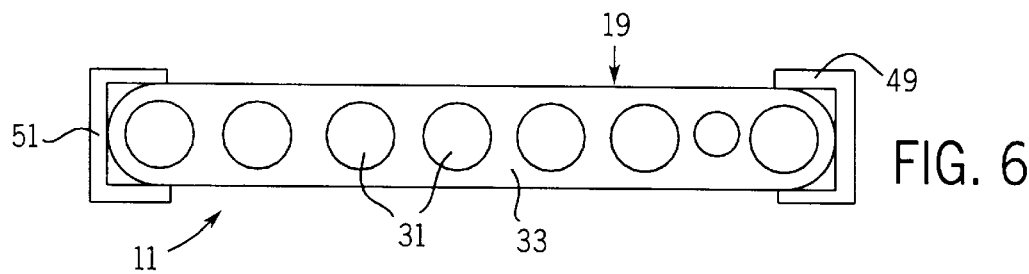
FIG. 6 shows an embodiment having laterally applied sliding channels.

FIG. 6 shows an embodiment in which the sliding means consist of two sliding channels 49 and 51, which are each positioned onto a longitudinal side edge of the ribbon cable 11. The sliding channels 49 and 51 have the advantage that they provide for low friction not only between upper length 15 and lower length 13 of the ribbon cable 11, but also between the two longitudinal side edges of the ribbon cable 11 and the side walls 27 and 29 of the line guiding channel 25.

Figure 7:
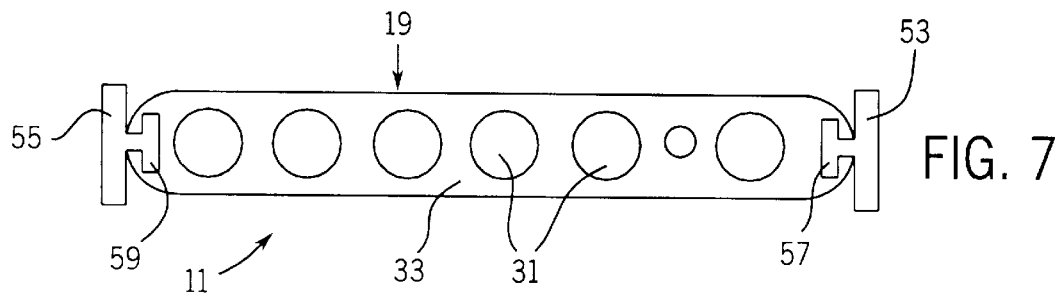
FIG. 7 shows an embodiment having lateral sliding ledges anchored in the cable jacket.

FIG. 7 shows an embodiment in which the sliding means has two sliding ledges 53 and 55 which are each disposed laterally beside one of the two longitudinal side edges of the ribbon cable 11 and each having a cross-sectional height greater than the thickness of ribbon cable 11. The two sliding ledges 53 and 55 provide for a good sliding effect between both the upper length 15 and the lower length 13 of the ribbon cable 11, and between the ribbon cable 11 and the two side walls 27 and 29 of the line guiding channel 25.

The sliding ledges 53 and 55 each have a T-shaped anchoring means 57 and 59 formed as an integral part of the associated sliding ledge 53 and 55, respectively, and anchored in the cable jacket 33 by extrusion.

Figure 8:
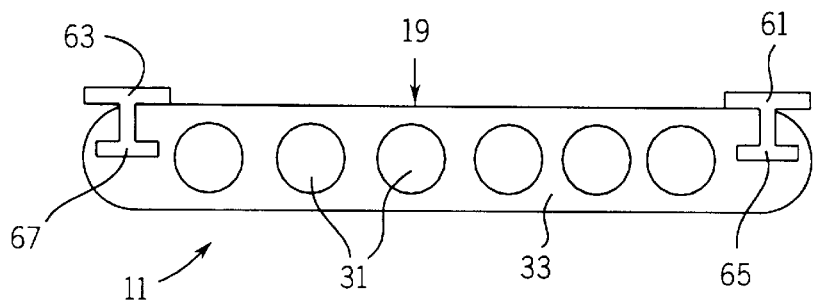
FIG. 8 shows an embodiment having a sliding ledges anchored in the cable jacket.

FIG. 8 illustrates an embodiment with sliding bands 61 and 63, which, similar to the sliding bands 21 and 23 in FIG. 3, are each disposed on an edge portion of the inside surface 19 of the ribbon cable 11. However, sliding bands 61 and 63 include T-shaped anchoring means 65 and 67, respectively, which serve to anchor the bands within the extruded cable jacket 33.

Figure 9:
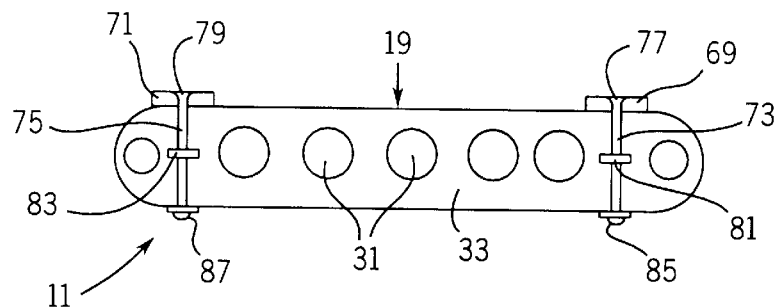
FIG. 9 shows another embodiment having sliding ledges anchored in the cable jacket.

FIG. 9 shows an embodiment with two sliding ledges 69 and 71 positioned at the same location as sliding ledges 21 and 23 in FIG. 3, but provided with anchoring means in the form of anchoring bolts 73 and 75, respectively. Bolt heads 77 and 79 of the anchoring bolts 73 and 75 are sunk in sliding ledges 69 and 71. The anchoring bolts 73 and 75 are passed through cable jacket 33, through anchoring plates 81 and 83 which are disposed in the cable jacket 33, and are fastened by means of anchoring nuts 85 and 87.

Figure 10:
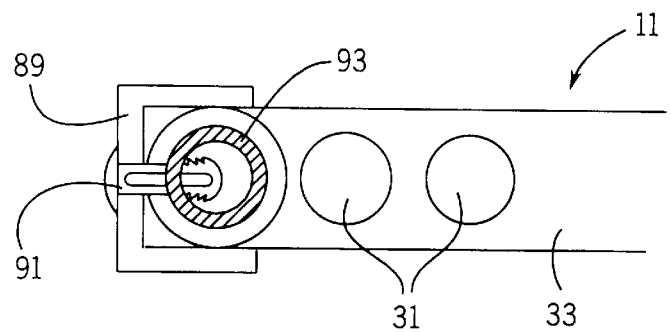
FIG. 10 shows a partial sectional view of an embodiment having a sliding channel anchored in the cable jacket.

FIG. 10 shows a sliding channel 89 similar to sliding channels 49 and 51 in FIG. 6. However, sliding channel 89 is anchored by means of an anchoring dowel 91 in an anchoring tube 93, which extends parallel to the electrical lines 31 and which is embedded in the cable jacket 33.

Figure 11:
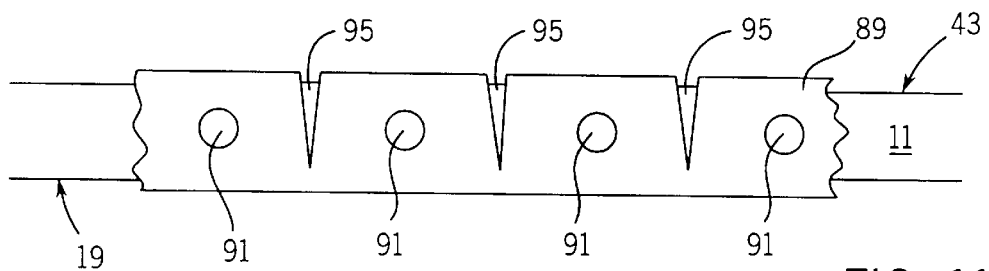
FIG. 11 shows a side view of the embodiment of FIG. 10, in which wedge-like gaps are illustrated.

FIG. 11 shows a side view of a ribbon cable 11, together with the sliding channel 89 of FIG. 10. This side view shows periodically spaced apart wedge-shaped gaps 95 disposed along the length of ribbon cable 11. The wedge-shaped gaps extend from the upper outside surfaces of the sliding channel 89, in a tapering wedge configuration, to a location near the lower inside surface of the sliding channel 89. The wedge-shaped gaps 95 continue in the upper (in FIG. 10) horizontal portion of the sliding channel 89. Between adjacent individual wedge-shaped gaps 95, FIG. 11 shows an anchoring dowel 91 of the type shown in FIG. 10.

Figure 12:
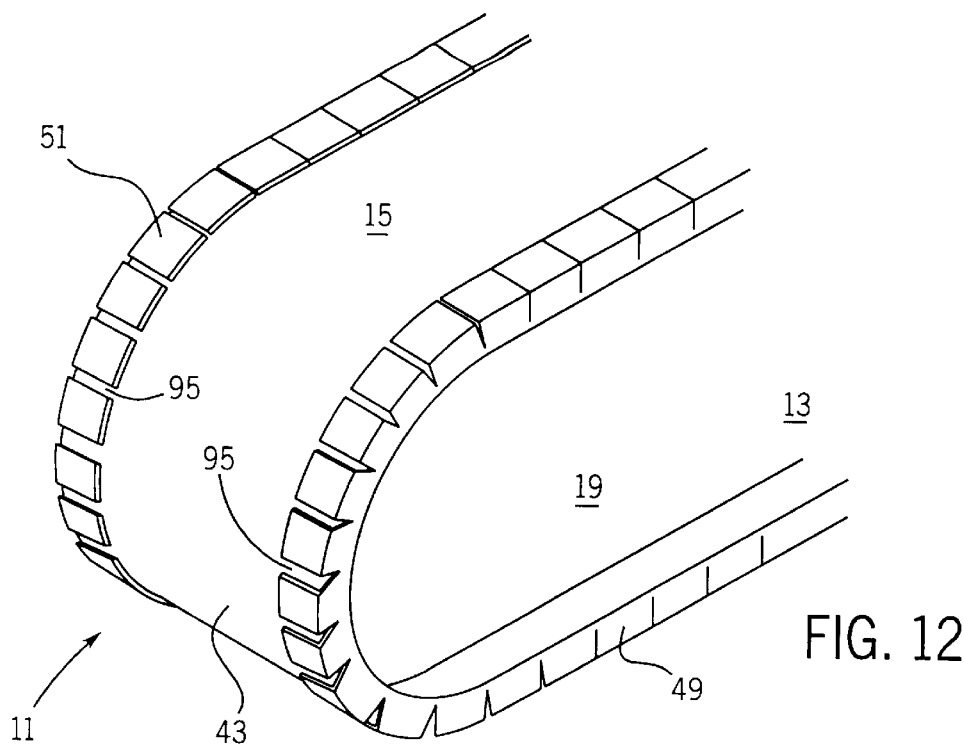
FIG. 12 shows a perspective fragmentary view of the embodiment of FIG. 6, illustrating wedge-like gaps.

FIG. 12 shows a perspective partial view of a ribbon cable 11, having at each of its longitudinal edges, a sliding channel 49 and 51. The two sliding channels 49 and 51 are provided with wedge-shaped gaps 95 of the type shown in FIG. 11. FIG. 12 also shows how the wedge-shaped gaps continue in the horizontal portions of the two sliding channels 51 and 49 located on the outside surface 43 of the ribbon cable 11.

Figure 13:
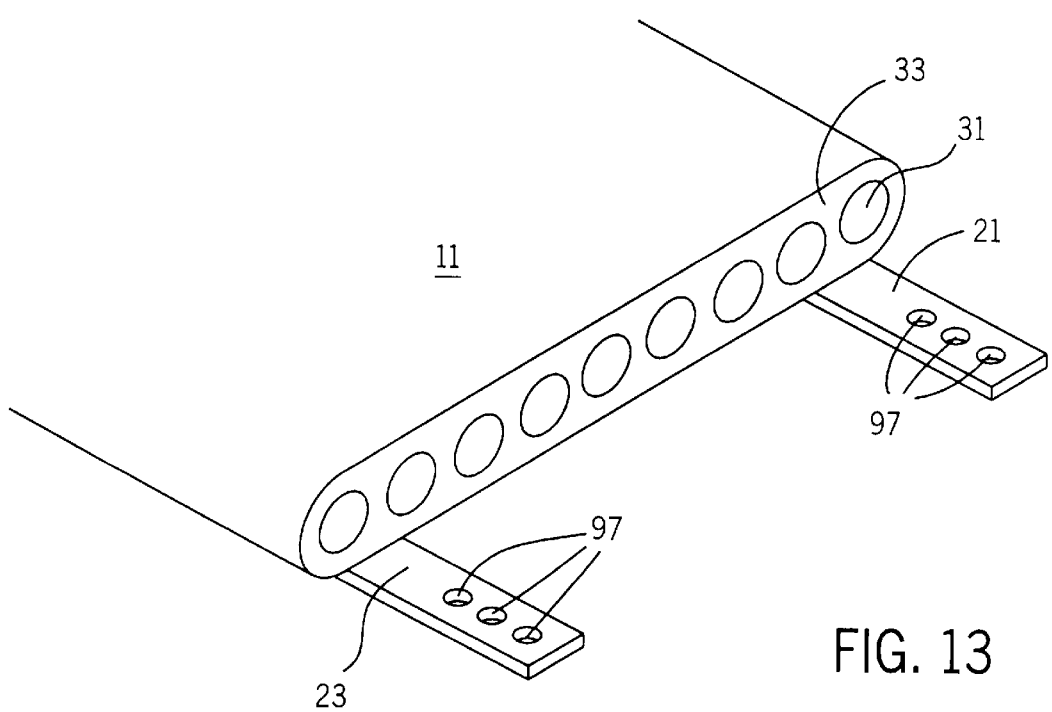
FIG. 13 shows an embodiment having sliding bands adapted to be connected to a stationary means or to a movable means.

FIG. 13 shows an embodiment with two sliding bands 21 and 23 extending beyond the free end of the ribbon cable 11 and provided with mounting holes 97 for connecting the sliding bands with the stationary means or the movable means (not shown in the drawings). Such a design provides a strain relief of the electrical lines 31 of the ribbon cable 11, and completely relieves the ribbon cable 11 of tensile and thrust forces exerted by the motion of the movable means on the assembly of ribbon cable and sliding means.

FIGS. 14–22 show various possibilities for mounting the sliding means to a ribbon cable. In the various embodiments these sliding means are sliding channels which are laterally attached to the ribbon cable.

Figure 14:
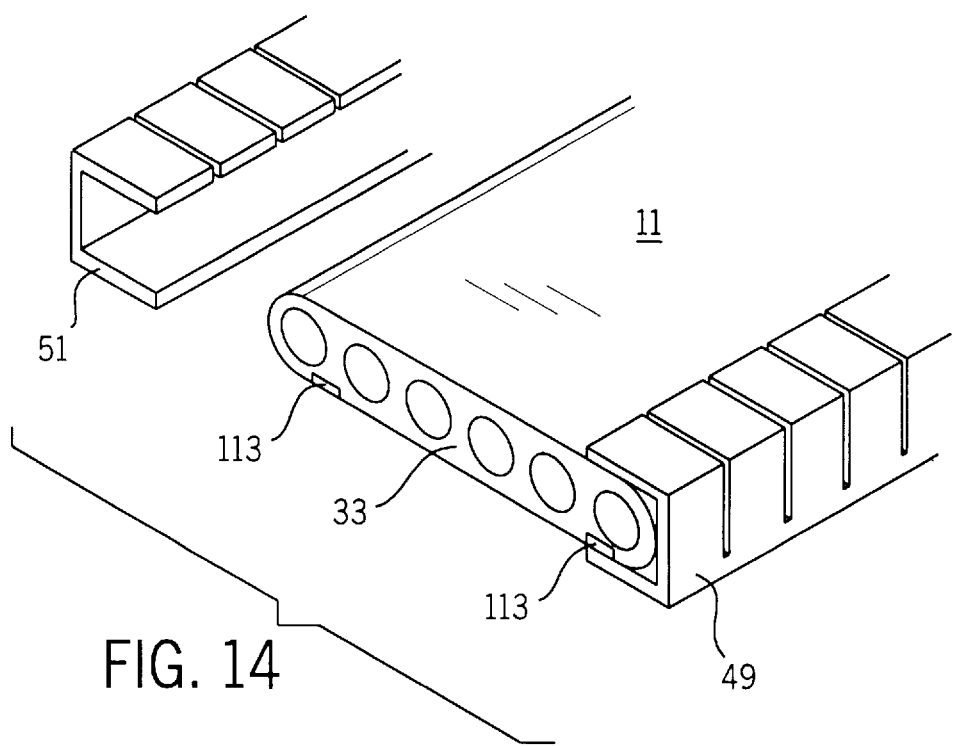

FIG. 14 shows an embodiment in which two parallel supporting strips 113 are embedded in the lower face of the ribbon cable 11. These strips consist of the same material as sliding channels 51 and 49, so that they are suitable for welding (e.g. ultrasonic welding) to sliding channels 49 and 51.

Figure 15:
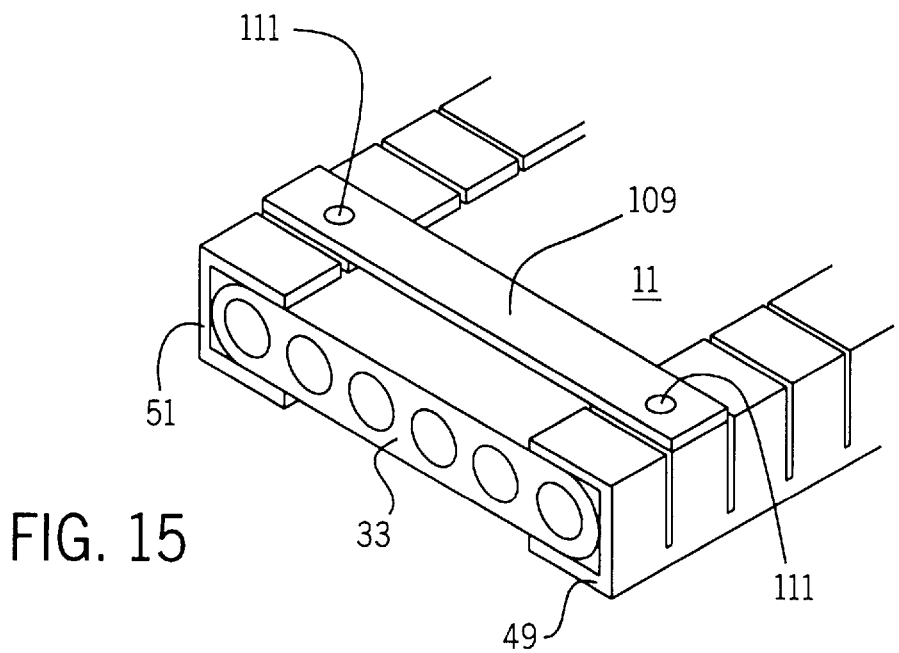
FIGS. 14–22 show various examples for mounting lateral sliding channels to a ribbon cable.

In the embodiment shown in FIG. 15, two sliding channels 51 and 49 are held together by means of a plurality of connecting straps 109. FIG. 15 shows only one such connecting strap 109. The connecting straps 109 may be attached to the sliding channels 49 and 51 for instance by ultrasonic welding at welding spots 111.

Figure 16:
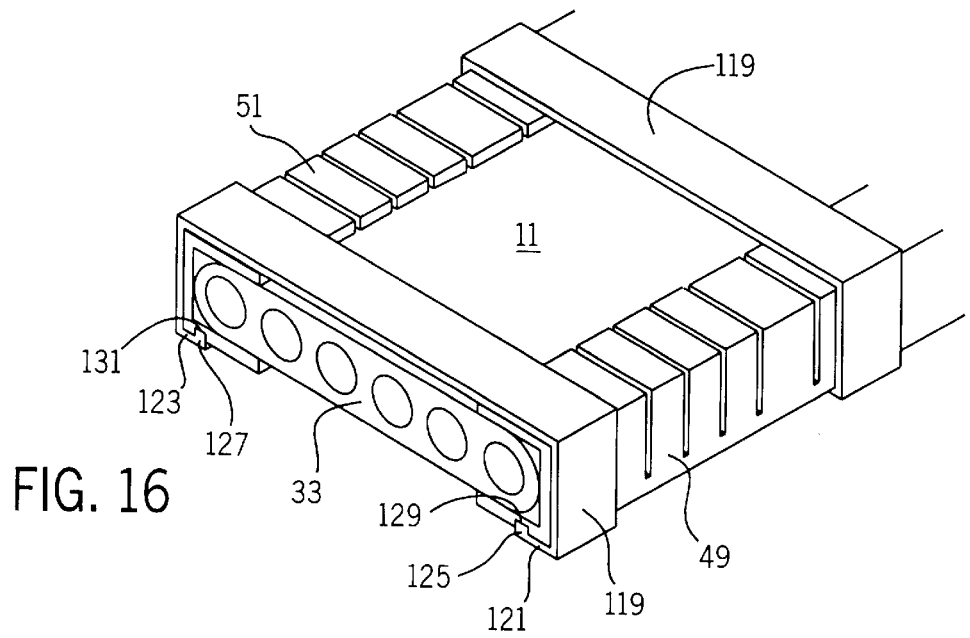

In the embodiment shown in FIG. 16, the two sliding channels 49 and 51 are held together by means of a number of clamps 119. The clamps 119 completely straddle the sliding channels 49 and 51 on the upper side in FIG. 16. On the bottom face of the ribbon cable 11, the straps have on both sides only a short latching arm 121 and 123, respectively. The free ends of the latching arms 121, 123 are provided with latching ribs 125, 127 projecting towards the ribbon cable 11 and engaging with corresponding recesses 129 and 131, on the bottom side of the sliding channels 49 and 51.

Figure 17:
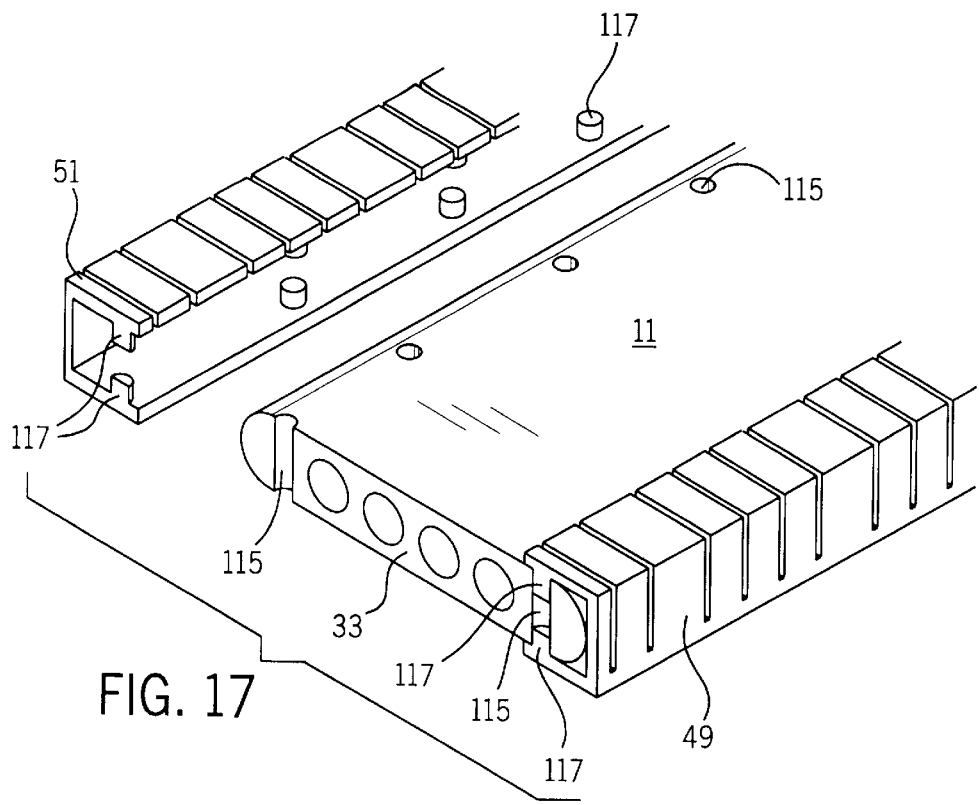

FIG. 17 shows an embodiment for a form fitting connection between ribbon cable 11 and sliding channels 49 and 51. In this embodiment, one row of spaced apart holes 115 is provided along each of the longitudinal side edges of the ribbon cable 11. The sliding channels 49 and 51 are provided at corresponding locations with pins 117 directed towards each other. For assembly, the sliding channels 49 and 51 are slid across the side edges of the ribbon cable 11 until the pins 117 snap into the corresponding holes 115.

Figure 18:
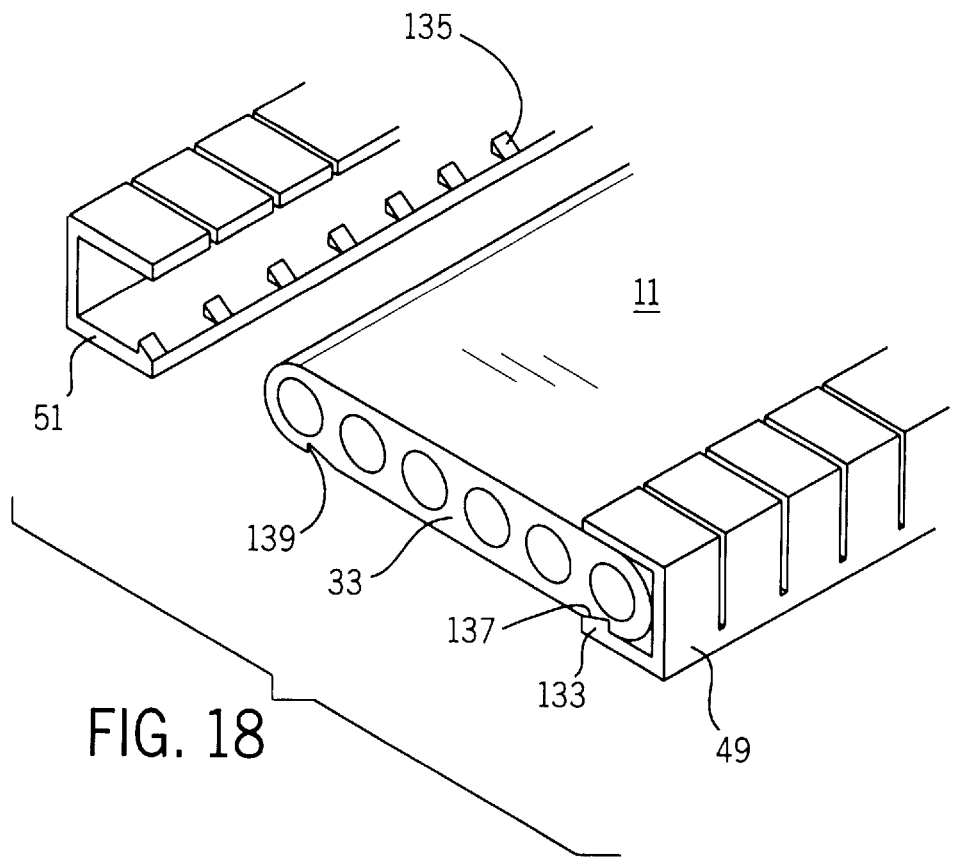

In the embodiment shown in FIG. 18, the lower free ends of the C-shaped sliding channels 49, 51 are provided with teeth-like latching projections 133, 135 which are adapted to be latched in correspondingly positioned and complementary latching recesses 137 and 139, on the bottom face of the cable 11.

Figure 19:
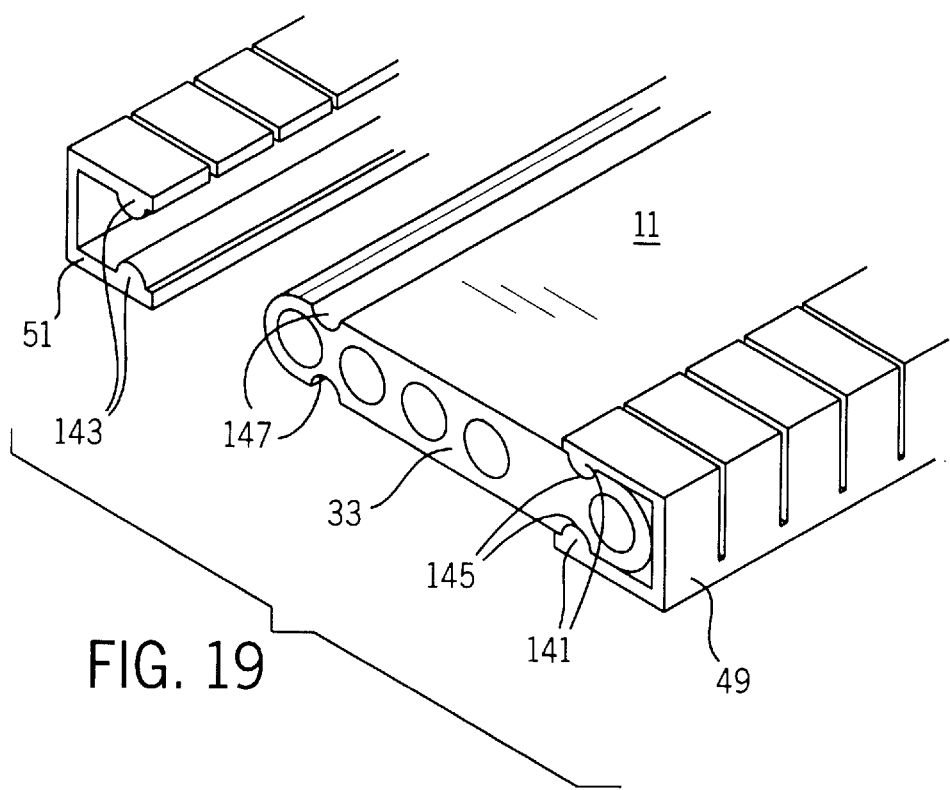

In the embodiment shown in FIG. 19, latching beads 141 and 143, project from the insides of the latching arms of the sliding channels 49 and 51. The latching beads engage shaped latching grooves 145 and 147, which are disposed in the longitudinal edge portions of the two faces of ribbon cable 11.

Figure 20:
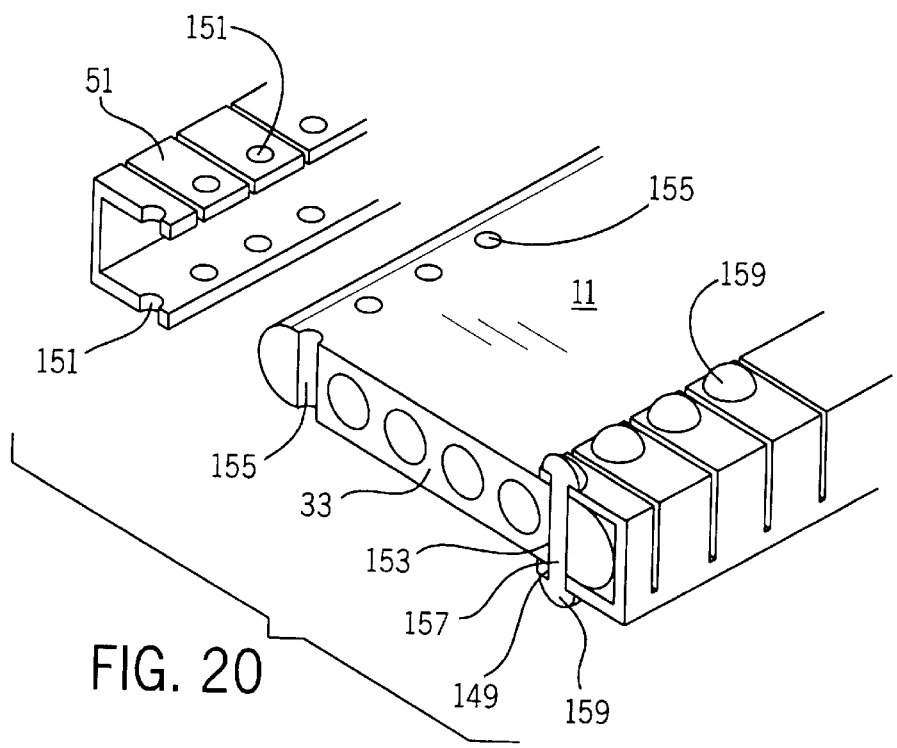

In the embodiment shown in FIG. 20, the latching arms of the sliding channels 49 and 51 are each provided with a row of latching holes 149 and 151, which extend in the longitudinal direction. The ribbon cable 11 is provided with associated through-passages 153 and 155. When the sliding channels 49 and 51 are attached to ribbon cable 11, the latching holes 149 and 151 are aligned with through-passages 153 and 155, such that locking pins 157 may be inserted through the aligned latching holes and through-passages. The pins are fixed by means of rivet-like heads 159 at both ends thereof. In doing so, the rivet-like heads 159, at one end of the locking pins 157, are formed only after passage of the pins through the latching holes 149 and 151 and through-passages 153 and 155.

Figure 21:
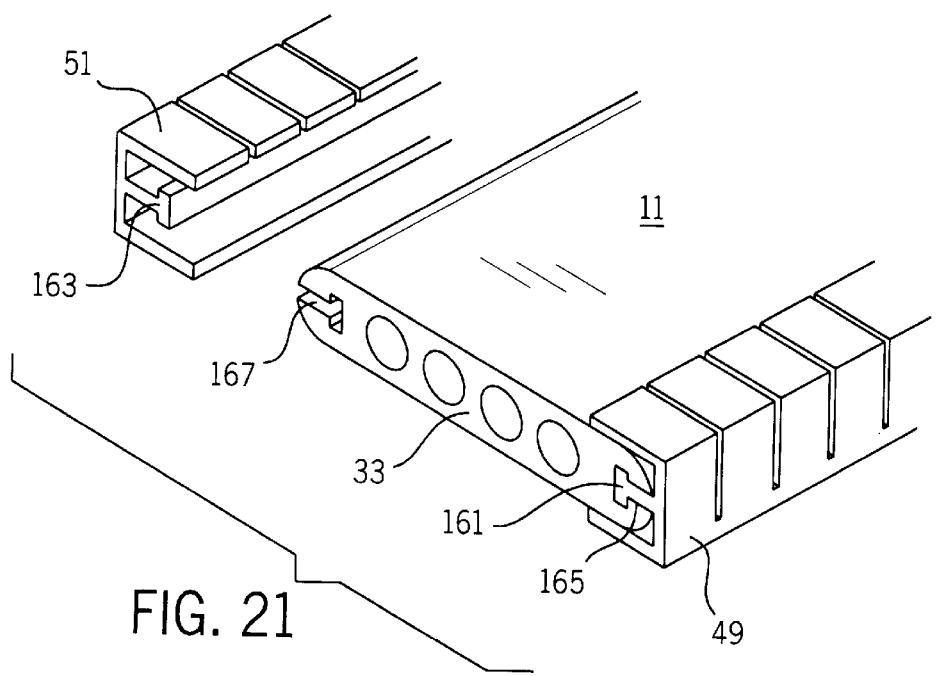

In the embodiment shown in FIG. 21, T-shaped latching ribs 161 and 163 project from the vertical inside walls of the sliding channels 49 and 51. The latching ribs 161 and 163 can be slidably inserted in corresponding latching grooves 165 and 167 in the longitudinal side edges of the cable jacket 33.

Figure 22:
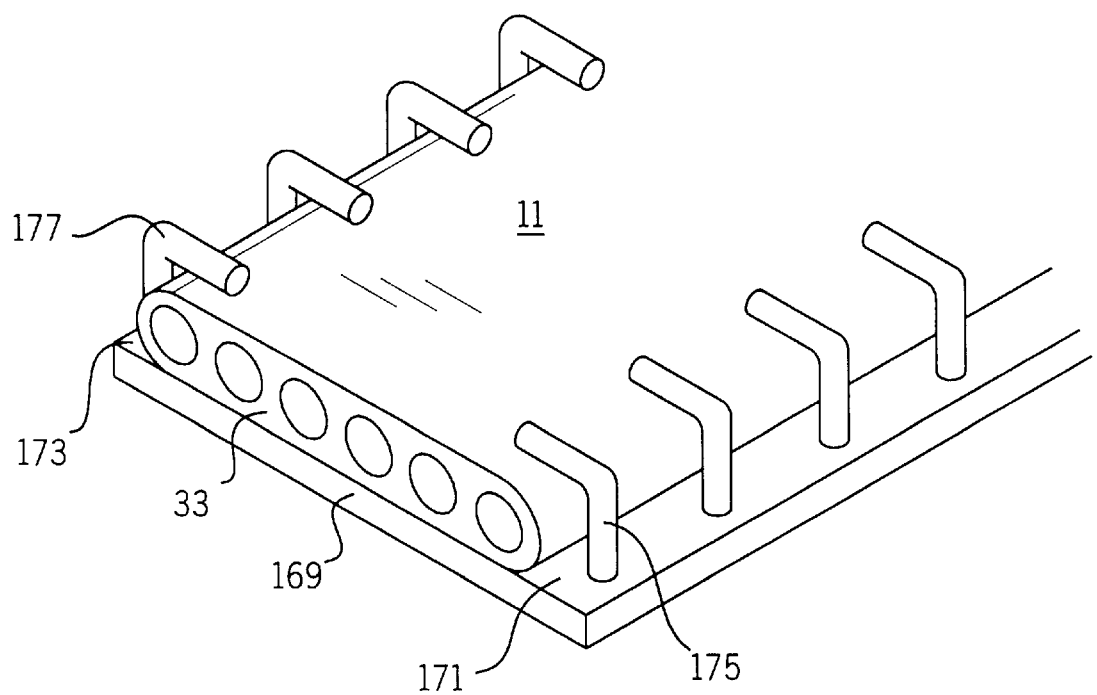

In the embodiment shown in FIG. 22, a sliding band 169 is provided as a sliding means, which projects on both sides beyond the side edges of the ribbon cable 11. In both laterally projecting portions 171 and 173 there are mounted holding pins 175 and 177, which are bent down in an angular manner onto the face side of ribbon cable 11, causing the ribbon cable 11 and the sliding band 169 to be held together.

Figure 23:
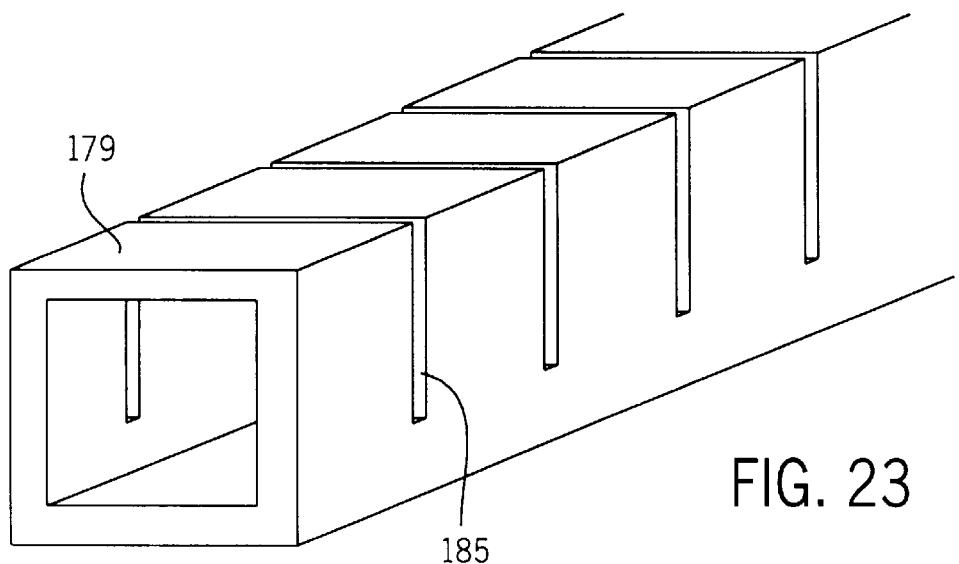
FIG. 23 shows a sliding means in the form of a closed line channel.
Figure 24:
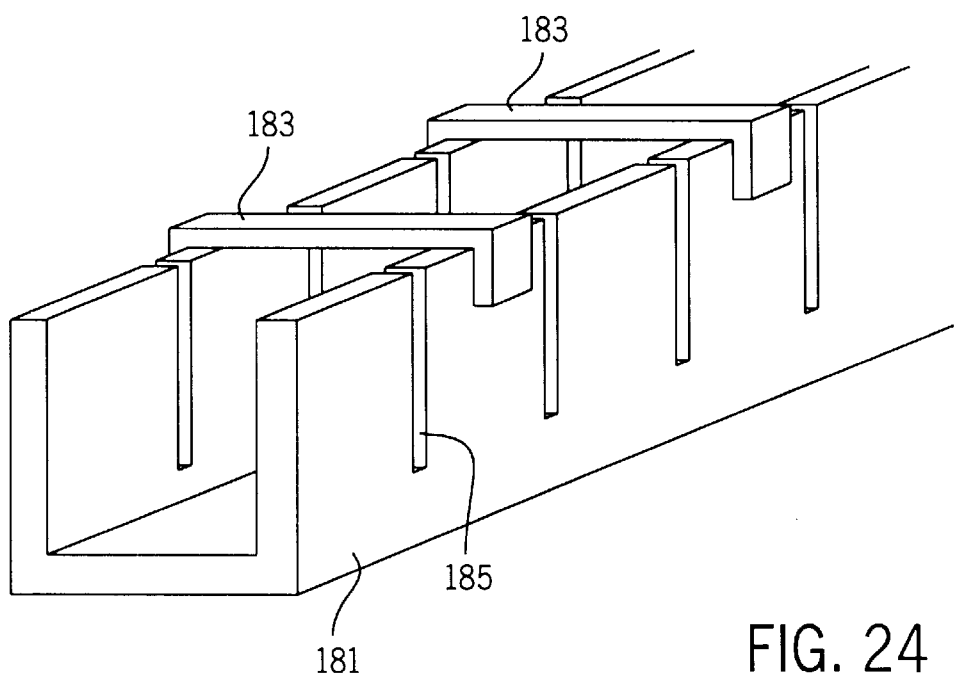
FIG. 24 shows a sliding means in the form of an open line channel.

In each of the embodiments described above, the ribbon cable 11 has a sliding means attached thereto. FIGS. 23 and 24 illustrate a sliding means in the form of line channels in which one or more cables or lines can be loosely inserted. In a closed line channel 179, illustrated in FIG. 23, the cables or lines are threaded into the line channel 179 from a longitudinal end. In a line channel 181, which is open on one side as shown in FIG. 24, the lines or cables can be introduced through the open channel side. Thereafter, the open channel side is closed by means of closure clasps 183 so that the inserted lines or cables do not fall out of the line channel 181. The closure clasps 183 are of strap-shaped configuration. After insertion of the lines or cables, the closure clasps can be welded to the side walls of the line channel 181 or can be connected thereto in any other suitable manner.

Both types of line channels 179 and 181 are provided with a multiplicity of flexure notches 185 spaced apart in longitudinal direction. Accordingly, the line channels 179 and 181 can be flexed in a manner corresponding to the loop 17 of the line assembly.

Figure 25:
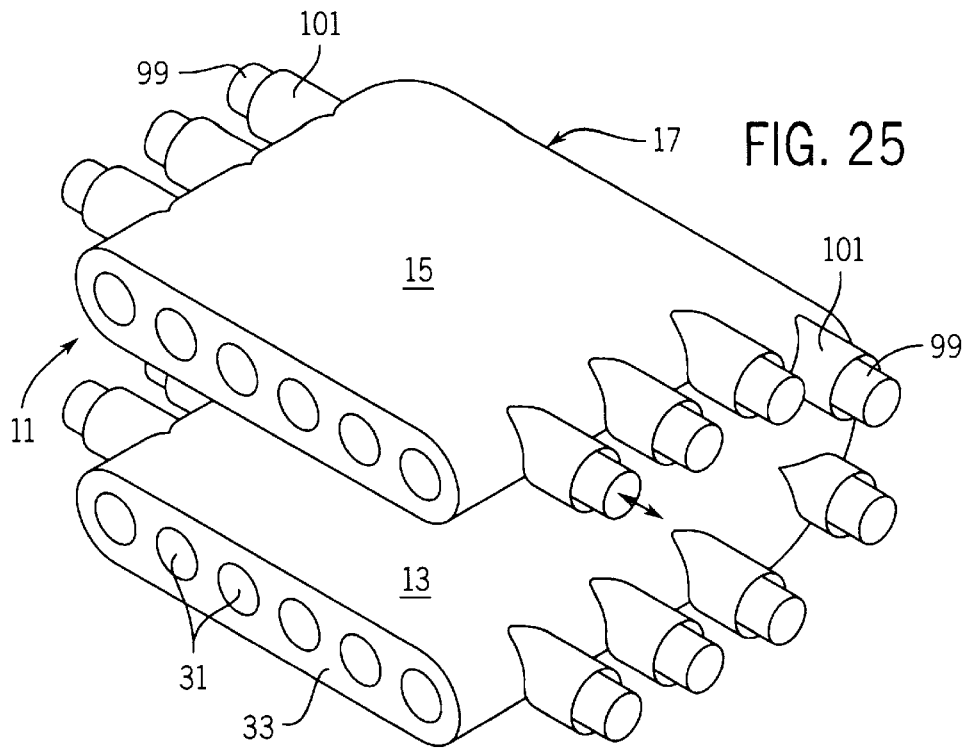
FIG. 25 shows an embodiment of a ribbon cable having laterally projecting sliding members.

FIG. 25 shows an embodiment of a ribbon cable 11 wherein each of the two longitudinal side edges of said cable has projecting therefrom a multiplicity of sliding members 99, which are spaced apart periodically in the longitudinal direction of the cable. The sliding members 99 are situated in receiving sleeves 101 fixed in the longitudinal side portions of the cable jacket 33. In the interior of each receiving sleeve 101 there is provided a compression spring 103, and due to the pressure force of the latter, the associated sliding member 99 projects with part of its length from the receiving sleeve 101. From their positions, the sliding members 99 can be urged into the receiving sleeves 101 against the pressure of their associated compression springs.

Figure 26:
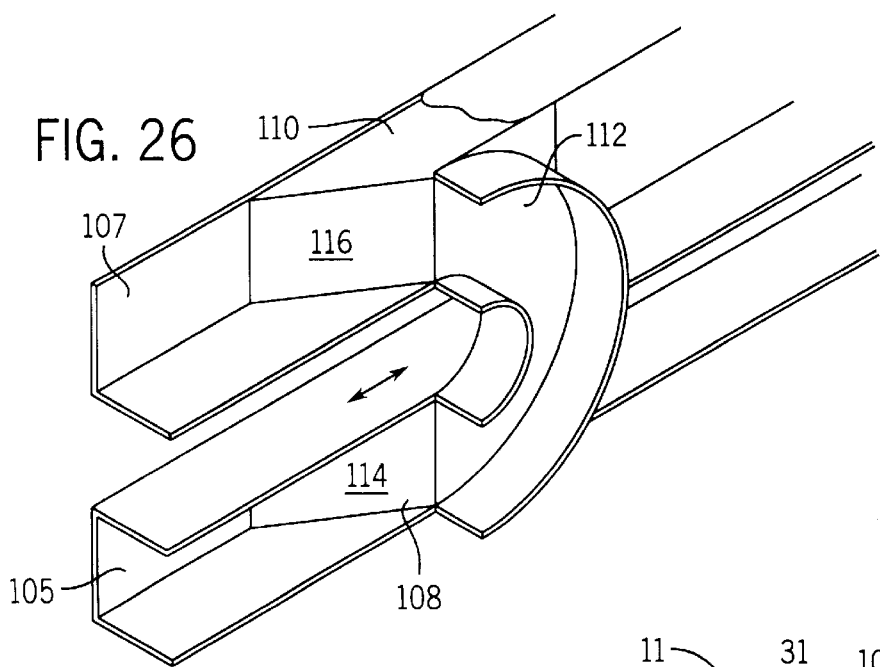
FIG. 26 shows an embodiment of a guiding channel for the sliding members of the ribbon cable in FIG. 25.

FIG. 26 shows a pair of guiding channels 105 and 107 shaped to receive the sliding members 99. The sliding members 99 projecting from the lower length 13 are guided in the lower guiding channel 105, and the sliding members 99 projecting from the upper length 15 are guided in the upper guiding channel 107. A matching guiding channel pair is disposed on the opposite side of the ribbon cable 11, but is rotated by 180° about the common longitudinal axis as compared to the position shown in FIG. 26.

FIG. 26 also shows the guiding channels 105 and 107 which each contain a sliding block 108 and 110, respectively, slidable in the longitudinal direction of the guiding channels. On the surface of the sliding blocks 108 and 110, facing outwardly from the guiding channels 105 and 107, there is disposed a semi-circular curved channel piece 112 whose free channel ends are open and are each connected via a ramp 114 and 116, to the floor of the associated guiding channel 105 and 107.

Figure 27:
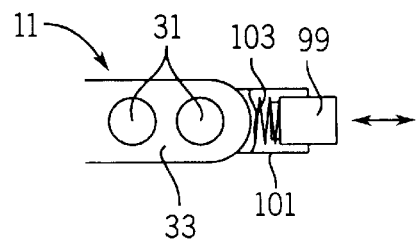
FIG. 27 shows a schematic view of a sliding member that is adapted to be urged inwardly against spring force.

In the embodiment shown in FIGS. 25–27, the upper length of the ribbon cable 11 is not deposited on the lower length 13, but upper and lower lengths 15 and 13 are held and guided in spaced apart condition by means of the sliding members 99 and the guiding channels 105 and 107. Assuming that the movable means connected to the upper length 15 of ribbon cable 11 is moved in a direction such that the sliding members 99 in the upper guiding channel 107 move toward the curved channel piece 112, the sliding members 99 reaching the region of the loop 17 move onto the ramp 116. By means of the ramp 116, these sliding members 99 are urged against the force of their compression springs 103 into their receiving sleeves 101 to such an extent that they are able to enter the guiding channel of the curved channel piece 112. During passage through the loop, these sliding members 99 move through the channel of the curved channel piece 112 and, upon leaving the latter, move onto ramp 114. While these sliding members 99 are guided via ramp 114, the force of their compression springs 103 causes them to move again further outwardly from their receiving sleeves 101 until they have finally left the ramp 114 and move away from the ramp 114 while being guided in guiding channel 105.

In this embodiment, guiding channels 105 and 107 are stationary. The concomitant motion of the portion of the loop 17 of the ribbon cable 11 along with the traversing motion of the movable means is rendered possible in this embodiment in that the curved channel pieces 112 are slidably held in guiding channels 107 and 105 with the aid of the sliding blocks 108 and 110. This slidability may be facilitated by means of bearing rollers.

There is the possibility of using several of the afore-described kinds of sliding means in a combined manner. For instance, the sliding band 45 in FIG. 4 may be used together with the sliding channels 49 and 51 in FIG. 6. Additionally, it may be possible to combine sliding band 45, or sliding bands 21 and 23 with the sliding ledges 53 and 55 in FIG. 7.

FIG. 28 illustrates an example of a group unit comprised of two line guiding assemblies according to the invention. Each line guiding assembly is comprised of a ribbon cable 11, which is positioned into respective 49 and 51. The two adjacent sliding channels 49 and 51 of the two ribbon cables 11 abut each other back to back. On their notched top side, the four sliding channels are held together by a number of transversely extending mounting straps 187 arranged in the longitudinal direction of the lines. These straps are firmly connected to each one of the four sliding channels by welding, gluing or the like.

FIG. 29 shows a view of a free longitudinal end of the group unit according to FIG. 28.

Figure 30:
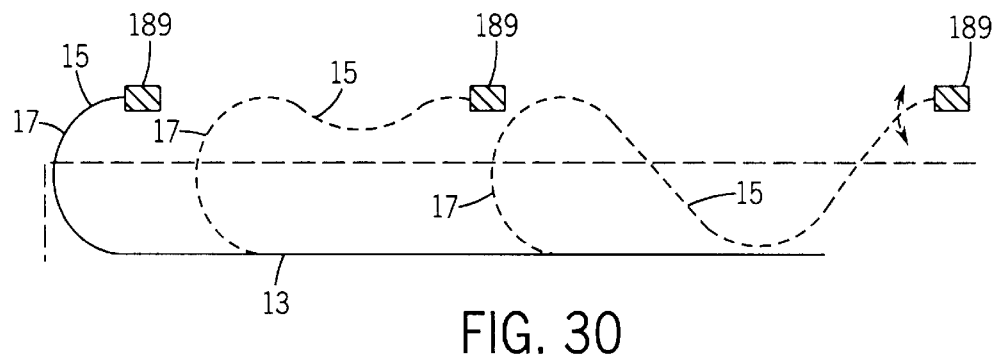
FIGS. 30 and 31 show schematic views of mechanical loads which may be exerted on the line assembly due to the reciprocating motions of the movable means.
Figure 31:
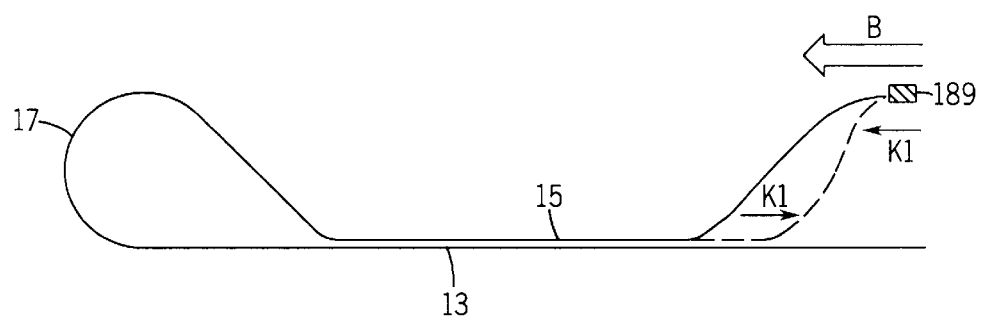

FIGS. 30 and 31 illustrate problems the invention seeks to eliminate. More particularly, FIG. 30 shows, in a schematic manner, various stages of movement of a movable means 189 away from the loop 17. The further the movable means 189 is moved away from loop 17, the deeper sags a central portion of the upper length 15 towards the lower length 13, until the upper length 15 is finally deposited on the lower length 13. In the region of the connection of the line guiding assembly to the movable means 189, there are caused to occur flexural movements of the line guiding assembly that may lead to an undesired mechanical load on the line guiding assembly and connecting members of the movable means 189.

FIG. 31 shows in a schematic view mechanical loads that may act on that portion of the upper length 15 of the line assembly that is located adjacent the movable means 189, when the movable means 189 is moved in a direction B towards loop 17. As outlined by a lower force arrow K1 and an upper force arrow K2, there are contrary forces acting on the upper length 15. These forces may create strong, disadvantageous mechanical loads in the upper length 15.

Figure 34:
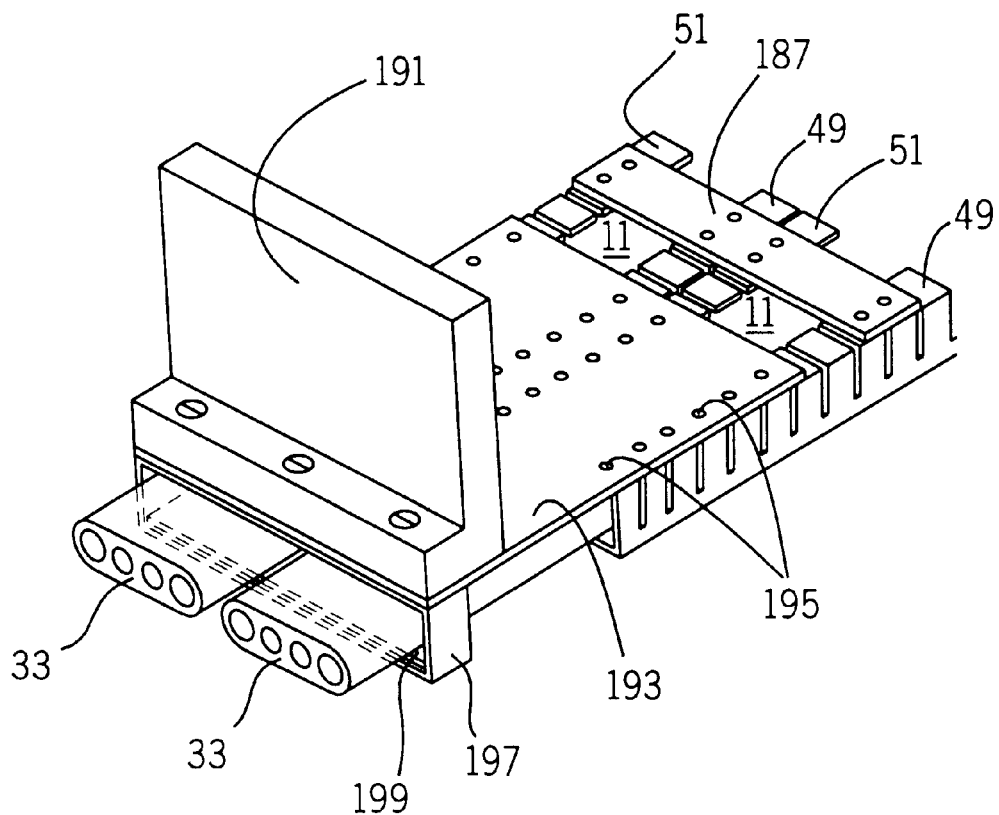
FIG. 34 shows a perspective view of a strain relief of the line assembly on the moving side.
Figure 35:
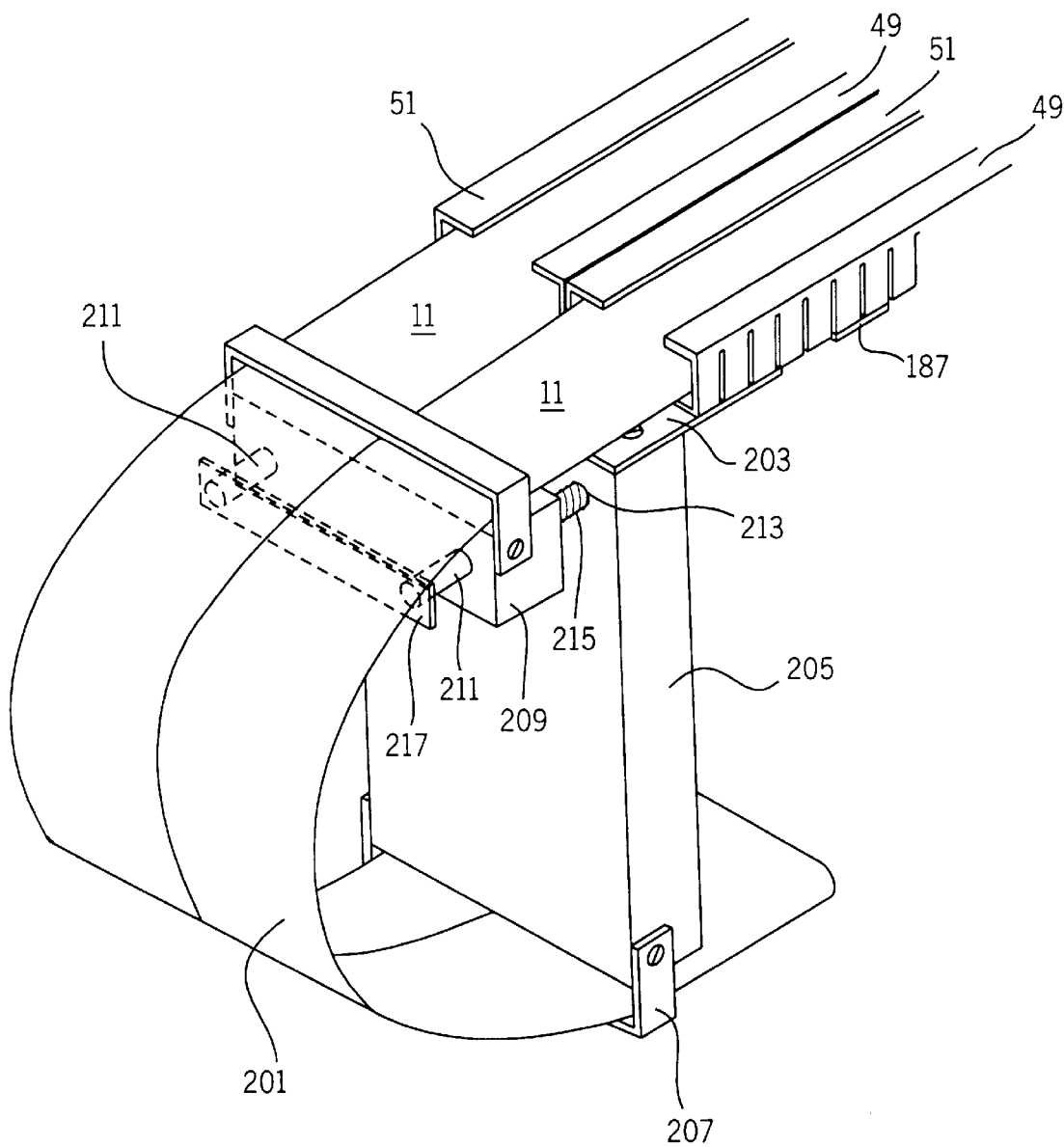
FIG. 35 shows a strain relief means at the stationary end of the line assembly.

FIGS. 32–35 illustrate line guiding assemblies according to the invention in which the problems addressed with respect to FIGS. 30 and 31 are overcome. FIGS. 34 and 35 detail the circle areas D34 and D35 of FIGS. 32 and 33.

Figure 32:
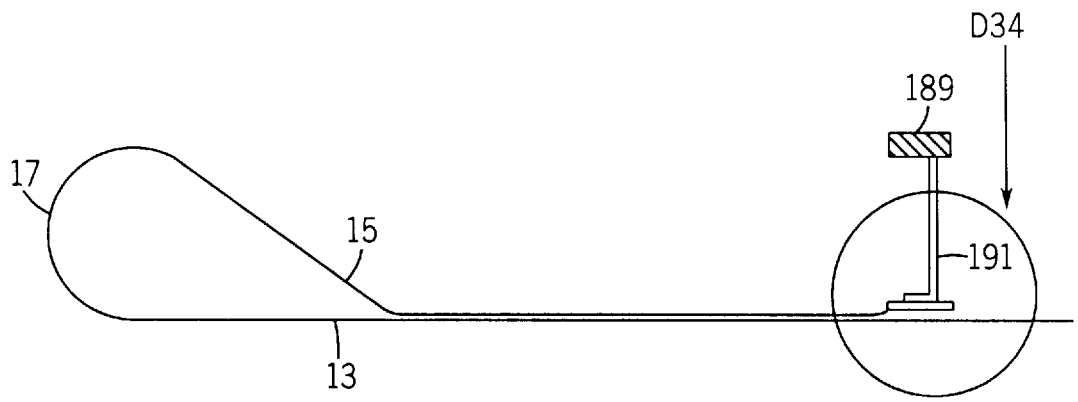
FIG. 32 shows a schematic view with a strain relief means on the side of the movable means.
Figure 33:
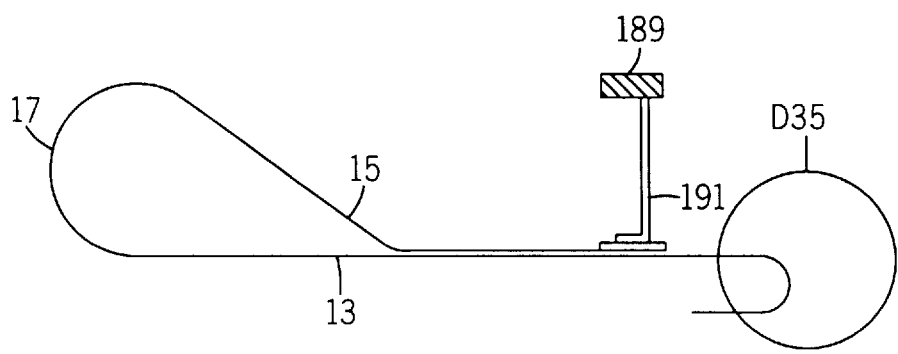
FIG. 33 shows a schematic view of a compensating means on the stationary side of the line assembly.

In FIG. 32, the movable means 189 has a downwardly projecting spacer 191 disposed thereon, having mounted on its bottom end a support for the associated free upper length end of the line assembly. The length of spacer 191 is chosen such that the free upper length end is always held on or closely above the lower length 13. Flexural movements of the upper length end connected to the support do not occur.

FIG. 34 shows a strain relief means in the region of the end of the upper length 15 connected to the movable means 189. This strain relief means comprises a holding plate 193 secured by means of mounting elements or welding spots 195 to the four sliding channels 49 and 51 of two ribbon cables 11 combined to form a group unit. Because the holding plate 193 is mounted only to the sliding channels 49 and 51, and not to the ribbon cables 11, it has the effect of a strain relief for the ribbon cables 11. At its end projecting beyond the ends of the sliding channels 49 and 51, the holding plate 193 is attached to the spacer 191 which, at the other end, is secured to the movable means 189 (not shown in FIG. 34). Furthermore, at the end of the holding plate 193 connected to the spacer 191, there is mounted a cable clamp 197 by means of which the portions of the ribbon cables 11 projecting from the sliding channels 49 and 51 are clamped in place. This may be achieved for instance by a clamping plate 199 which is located between the floor of the cable clamp 197 and the ribbon cables 11, and which can be urged against the ribbon cables 11 by means of screws (not shown in FIG. 34).

The detailed view of FIG. 35 shows the end of the line assembly connected to the stationary means, which has a compensation loop 201. At the ends of the sliding channels 49 and 51 of two ribbon cables 11, there is again a strain relief plate 203 attached thereto, the free end thereof being connected to a spacer plate 205. At the lower end thereof, there is disposed a lower line clamp 207 by means of which the free ends of the two ribbon cables 11 can be clamped in relation to the spacer plate 205. At the upper end of the spacer plate 205 there is provided an upper cable clamp 209 in which the ribbon cables 11 can be clamped in their portion where they exit from the sliding channels 49 and 51. In the region of its two lateral ends, the upper cable clamp 209 has includes a pair of holding bolts 211. The ends of the bolts 211 on the side of the spacer plate are each slidably held in a bolt receiving hole of the spacer plate 205. A coil spring 215 is seated on each holding bolt 211. The opposite ends of the two holding bolts 211 are connected to a mounting plate 217 by means of which the holding bolts 211 are held in unmovable manner. The spacer plate 205 can be fixed on line guiding channel 25. The compensation loop 201 renders possible the compensation of cable motions at the end of the lower length 13 connected to the stationary means, which are created for instance when the cable is inserted only in the sliding channels or the line channel without being fixedly connected to the sliding channels or the line channel, respectively.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

What is claimed is:

1. A line guiding assembly comprising a line guiding channel and a ribbon cable with cable jacket guided therein and having a lower length and an upper length guided thereabove, said lengths merging with each other in a loop-shaped manner at a line end of the ribbon cable, with a first free end of the ribbon cable being connected to a stationary means and a second free end of the ribbon cable being connected to a means adapted to reciprocate in the longitudinal direction of the ribbon cable, wherein the ribbon cable is provided along longitudinal edges thereof with a sliding means, which acts in the longitudinal direction of the ribbon cable and prevents friction between the upper length and the lower length of the ribbon cable, wherein said sliding means is attached to the ribbon cable, and wherein the sliding means includes a pair of sliding channels held together by a plurality of connecting straps.

2. The line guiding assembly of claim 1, wherein the sliding means is comprised of polyurethane.

3. The line guiding assembly of claim 1, wherein the sliding means is comprised of polyamide.

4. The line guiding assembly of claim 1, wherein the sliding means is comprised of polytetrafluoroethylene.

5. The line guiding assembly of claim 1, wherein the sliding means is comprised of steel.

6. The line guiding assembly of claim 1, wherein the sliding means is of a greater stiffness than the material of the cable jacket.

* * * * *